United States Patent [19]
Ueda

[11] 3,868,703
[45] Feb. 25, 1975

[54] LIGHT MEASURING DEVICE FOR SHUTTER CONTROL MECHANISM

[75] Inventor: Hiroshi Ueda, Nara, Japan

[73] Assignee: Minolta Camera Kabushiki Kaisha, Osaka-shi, Osaka-fu, Japan

[22] Filed: May 14, 1973

[21] Appl. No.: 360,308

Related U.S. Application Data

[63] Continuation of Ser. No. 145,311, May 30, 1971, abandoned.

[30] Foreign Application Priority Data
May 20, 1970 Japan.................................. 45-43567

[52] U.S. Cl.................................. 354/49, 354/154
[51] Int. Cl. ............................................... G03b 7/08
[58] Field of Search ........... 95/10 C, 57, 42, 10 CT; 332/141; 350/126; 354/154, 49

[56] References Cited
UNITED STATES PATENTS

| | | | |
|---|---|---|---|
| 2,267,995 | 12/1941 | Shugar.................................. | 350/126 |
| 2,668,474 | 2/1954 | Rogers, Jr........................ | 95/10 C X |
| 2,842,025 | 7/1958 | Craig................................. | 95/10 C X |
| 3,116,676 | 1/1964 | Ball..................................... | 95/57 X |
| 3,454,687 | 7/1969 | Ciofani .............................. | 350/126 X |
| 3,687,026 | 8/1972 | Kobayashi et al. ................. | 95/57 X |
| R26,326 | 12/1967 | Van der Feyst..................... | 332/141 |

Primary Examiner—John M. Horan
Assistant Examiner—E. M. O'Connor
Attorney, Agent, or Firm—Watson, Cole, Grindle & Watson

[57] ABSTRACT

A camera having detecting means for detecting a light passed through the objective lens, comprising photocells which receive light rays transmitted through an objective lens and which are disposed in front of a light sensitive member but out of the way of the light path of the focusing image light passed through the objective lens, the first screen (the front screen) of a focal plain shutter which is started to run out when said photocells receive the reflected light from the first screen surface at the side confronting to the objective lens and from the light sensitive surface of the photosensitive element, and an exposure time control device which is activated at the same time when the first screen of the focal plain shutter is started to run out, so that the starting time when the second screen of the focal plain shutter is started to run is thereby controlled, wherein the scattering property of the first screen of the focal plain shutter equal to the scattering property of the light sensitive member. The surface of the front shutter contain facing the objective has a film of thin transparent material thereon, the material having dispersed therein particles having a refractive index different from that of said material.

7 Claims, 3 Drawing Figures

LIGHT MEASURING DEVICE FOR SHUTTER CONTROL MECHANISM

This is a continuation, of application Ser. No. 145,311 filed May 20, 1971, now abandoned.

BACKGROUND OF THE INVENTION

The present invention relates to a camera of the type in which the shutter speed is automatically controlled by the detecting means for detecting the light passed through an objective lens from an object, more particularly to the improvement of the reflecting surface of the first screen of a shutter in a camera of an exposure control type, whereby the reflecting power (i.e., the ratio of reflected light quantity to incident light quantity) of the first screen of the shutter is equalized to the reflecting power of the light sensitive surface of a light sensitive member, and the detecting the light passed through the objective lens from an object in the time period from the starting time of the first screen of the shutter through the termination of an exposure on to the light sensitive member is carried out by photocells which are disposed in front of the light sensitive member but out of the way of the light path of the focusing image light passed through the objective lens.

The present invention relates to the improvement of the commonly owned copending application, U.S. application No. 89406 filed on Nov. 13, 1970 (German application No. P2056239.4 filed on Nov. 16, 1970), now U.S. Pat. No. 3,687,026, dated Aug. 29, 1972, which is entitled "A Light Measuring Device for a Shutter Control Mechanism".

In a conventional camera having detecting means for detecting the light passed through the objective lens photocells are withdrawn from the light path region between the photographing lens and the light sensitive member during an exposure on to the surface of the light sensitive member at the time of a photographing, consequently the exposure in that duration is not controlled, and the control of the exposure is achieved by the memorized detected quantity of the transmitted light rays which have been detected prior to the photographing, an accurate exposure control during the exposure of a photographing is accordingly impossible, and it is additionally defective in that its exposure control mechanism becomes complicated on account of the provision of a memory device or the like which is required therefor.

In the invention described in the aforementioned copending application, U.S. application No. 89406 (German application No. P2056239.4), the aforesaid defects in the prior art are eliminated by providing therein an exposure time control device with which a detecting light during a photographing exposure on to the light sensitive member is also made possible, because of that the reflecting power of the first screen of the focal plain shutter, is approximately equalized thereby to the reflecting power of the light sensitive surface of the light sensitive member.

However, even though the reflecting power of the first screen of the shutter is equalized to the reflecting power of the light sensitive surface of the light sensitive member, the reflection on the metallic shutter screen made of a metal such as titanium stainless alloy or the like and coated thereon with a thin transparent layer scatters light mainly a surface scattering therefore, the directional output characteristics of the photocells between both cases of the first screen of the shutter and the light sensitive member are outstandingly different from each other, and since the output of the photocells are affected, when the shutter is operated in a high speed, by the amount of the reflected rays of the first screen of the shutter rather than the amount of the reflected rays of the light sensitive member, the difference aforementioned defectively results in attaining an accurate exposure control.

OBJECTS OF THE INVENTION

An object of the present invention is to obviate the aforementioned defects in prior art in the which the light transmitted through the objective lens is detected, by providing a camera in which the reflecting power of the light sensitive surface of a light sensitive member is approximately equalized to the reflecting power of the first screen of the shutter, as well as the scattering property (i.e., the characteristic showing the manner in which the intensity of reflected light undergoes a change according to the direction of the reflected light) of the first screen of the shutter is equalize to the scattering property of the light sensitive surface of the light sensitive member, thereby the exposure time is capable of being accurately controlled.

The other object of this invention is to provide a camera of the type detecting the light passed in which, for the purpose of equalizing the scattering property through the objective lens of the first screen of the focal plain shutter to the scattering property of the light sensitive surface of the light sensitive member, formed in the transparent substance layer on the base plate of the metallic screen which is made of titanium stainless alloy or the like, and which comprises of the first screen of the focal plain shutter, is a layer dispersed with substances of which the refractive indices are different from that of said transparent substance layer.

SUMMARY OF THE INVENTION

The present invention relates to a camera of the type having a light receiving element which receives the reflected ray of the light beam transmitted through the objective lens and reflected by the first screen of the focal plain shutter and by the light sensitive surface of a light sensitive member, and by means of an exposure time control device having the light receiving element, the second screen of the focal plain shutter is controllably started for terminating the exposure, wherein the reflecting power of the surface of the first screen of the screen shutter, said surface being faced to the objective lens, is caused to correspond to the reflecting power of the light sensitive surface of the light sensitive member and, in order that the scattering property of the former will correspond to that of the latter, a film of thin transparent material is coated on the surface facing the objective lens of the first screen of titanium stainless alloy or the like, and in said transparent film a substance having a refractive index other than the refractive index of said film is dispersed.

Accordingly, the light ray entering into the transparent substance layer of the first screen of the metallic shutter is scattered about within the transparent substance layer so as to diffuse within the layer and finally to get out from its surface, the first screen of the focal plain shutter is thereby provided with the scattering property of the like with the directional output characteristics of the diffused light ray owing to the light ray reflected on the light sensitive surface of the light sensitive member.

An accurate exposure control of the camera is accordingly effected by a detecting means therein which is able to detect the light ray reflected both by the first screen of the metallic shutter and by the light sensitive member.

DESCRIPTION OF THE PREFERRED EMBODIMENT

Figure 1:
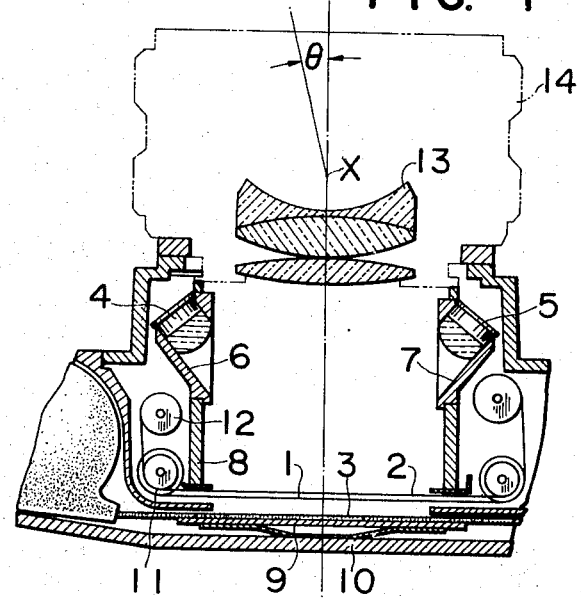
FIG. 1 is a sectional view showing an example of a camera of the type detecting the light passed through the objective lens in which the present invention is embodied.

Describing the present invention with reference to the accompanying drawings, in FIG. 1, reference numeral 1 denotes the first screen (the front screen) of the focal plain shutter, reference numeral 2 is the second screen (the rear screen) of the focal plain shutter, and reference numeral 3 shows a light sensitive member which is supported by a film pressing plate 9 disposed within a rear cover 10 of a camera. Reference numerals 4 and 5 denotes photocells of a detecting means which are arranged in front of the light sensitive member 3 and out of the way of the photographing light path which is directed from the objective lens 13 to the light sensitive member 3, so that they are able to receive the reflected light ray from both the screen face of the first screen 1 of the shutter and the light sensitive surface of the light sensitive member 3. Reference numerals 6 and 7 denote hoods of the detecting means, and reference numeral 8 denotes a light shielding plate. Two screen winding drums 11 and 12 of the first screen 1 and the second screen 2 of the shutter are respectively biased so as to rotate in the clockwise direction by their respective springs, not shown in the drawing. Reference numeral 14 denotes a lens barrel.

In such a camera, as described in the aforementioned patent, the reflecting power of the first screen 1 of the shutter is approximately equalized to the reflecting power of the light sensitive surface of the light sensitive member 3, and the light ray reflected by the first screen 1 of the shutter and by the light sensitive surface of the light sensitive member 3 is detected by the photocells 4 and 5. The exposure control circuit is thereby activated so as to control the running of the second screen 2 of the shutter, the exposure time being accordingly regulated.

However, even though the reflecting power of the first screen 1 is approximately equalized to the reflecting power of the light sensitive surface of the light sensitive member, the output characteristics of each of the light rays reflected respectively by the first screen 1 of the shutter and by the light sensitive surface of the light sensitive member 3 are outstandingly different from each other at the detecting positions 4 and 5. Namely, the directional output characteristics at the detecting positions 4 and 5 with respect to the light ray which was reflected by the light sensitive surface of the light sensitive member 3 due to an object of a point light source is such that as shown in FIG. 2.

Figure 2:
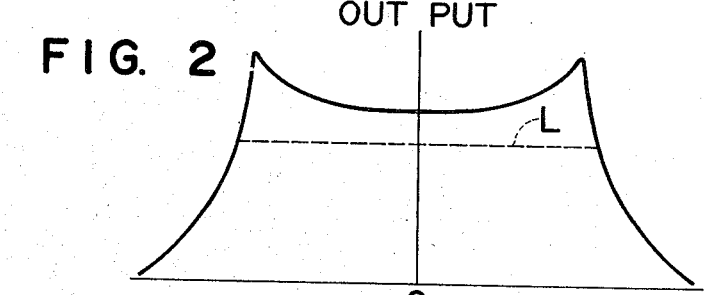
FIG. 2 shows the relative output of current generated by photocells for receiving light reflected by the light sensitive surface of a light sensitive member, which light is emitted from a point source and passed through the objective lens, in response to angle $\theta$ between the incident ray incident upon the center of the objective lens from the point source and the axis of the objective lens.

In FIG. 2, the abscissa indicates an angle $\theta$ which is made between the point light source and the optical axis of the objective lens 13, and the ordinate indicates the output.

Generally speaking, the scattering property may be classified into two types, i.e., one type is the internal layer scattering of the light rays which are scattered by a transparent substance including substances of which refractive indices are different from that of the transparent substance and which are dispersed within a transparent body, and the other type is the surface scattering of the light rays scattered by the faces of which boundaries are shaped of coarse ruggedness.

The light sensitive member is coated on a base plate with a layer which comprises a light sensitive material consisting of halide-silver of fine crystalized particles (0.1 – 2 micron in radius) which have been dispersed in an aqueous solution of gelatin. Consequently, the scattering property from the light sensitive member, as shown in FIG. 2 by the upper and the lower parts above and below a dotted line L, is composed of the internal layer scattering of the lower part under the dotted line L and the surface scattering of the upper part above the dotted line L.

Whereas, even if the reflecting power of the first screen 1 of the shutter is approximately equalized to the reflecting power of the light sensitive surface of the light sensitive member 3, the directional output characteristics at the photocells 4 and 5 due to the first screen 1 of the shutter can not be equalized to the directional output characteristics of the light sensitive member by such an equalizing means only as described above.

Figure 3:
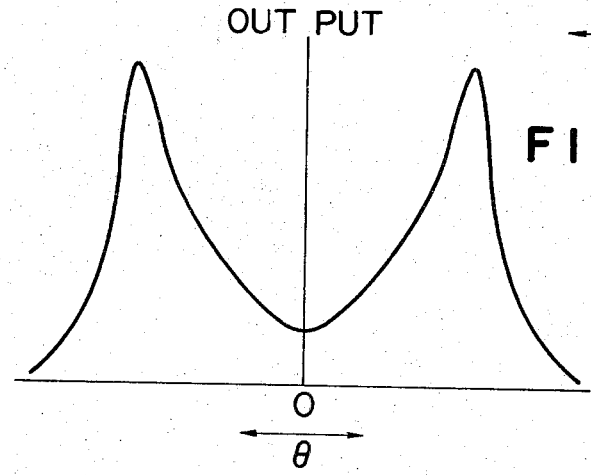
FIG. 3 shows the relative output of generated current generated by photocells by receiving light reflected from a shield member having the same reflecting power as that of the light sensitive surface, which light is emitted from the point source and passed through the objective lens, in response to the angle $\theta$.

Furthermore, because the scattering from the metallic shutter screen 1 which is made of a titanium stainless alloy or the like and coated with a thin transparent film is principally composed of the surface scattering, even if such a metallic shutter screen as above is made so as to have the reflecting power thereof equalized to the relfecting power of light sensitive surface of the light sensitive member, the directional output characteristics thereof at the detecting position in the case where a point light source at the first screen 1 of the shutter is angularly revolved with respect to the optical axis of the lens will be represented by a curve as shown in FIG. 3. As seen in this curve, the regular reflection due to a flat surface produces an intensive output, and the surface scattering due to slight ruggedness on the surface is also represented as an output of less intensity.

As clearly understood by comparing FIG. 2 with FIG. 3, there is an outstanding difference between respective directional output characteristics of the first screen 1 of the metallic shutter made of titanium stainless alloy or the like coated with a thin transparent film and of the light sensitive member 3, even though the reflecting power thereof are merely equalized to each other. Consequently, an accurate exposure control becomes impossible due to the difference therebetween, since the output of the photocells 4 and 5, in the case of a high shutter speed, depends on the intensity of the reflected light rays from the first screen 1 of the shutter rather than the intensity of the reflected light rays of the light sensitive member element 3.

According to the present invention, in order to solve this problem, the shutter screen comprises a base plate of a metallic screen made of a titanium stainless alloy or the like, and a transparent substance layer which is coated on the base plate and in which are dispersed substances of which the refractive indices are different from that of the transparent substance layer, whereby the internal layer scattering by which the light entered into the transparent substance layer is scattered about within the layer and gets out again from the surface thereof is intensified, the scattering property of the first screen of the metallic shutter is accordingly capable of being equaliized to the directional output characteristics of the light rays reflected and scattered by the light sensitive surface of the light sensitive member.

When such a screen 1 having the scattering property identical with that of the light sensitive member is put in use in conjunction with a detecting means of a camera, the exposure time thereof can be accurately controlled.

In addition, in practical use as said substances with refractive indices respectively different from that of the transparent susbstance layer in which the substances are respectively dispersed, and which is coated on the base plate of the metallic shutter screen as aforesaid, said transparent substance layer consisting of high polymers of expoxy resins or the like and having its refractive index of about 1.45 through 1.60, were, for example, zinc sulfide (ZnS, white, refractive index 2.37), titanium white ($TiO_2$, white, refractive index 2.76), chrome yellow ($PbCrO_4$, yellow, refractive index 2.34), graphite (black), or carbon (C, black) or the like, and saitsfactory results were thereby obtained.

As described hereinabove, by dispersing substances having their respectively different refractive indices in a transparent substance layer coated on the base plate of the metallic shutter screen, the internal layer scattering is realized on the reflective face of the metallic shutter screen, thereby the first screen of the metallic shutter having the directional output characteristics similar to that of the light sensitive member, such as shown in FIG. 2, is capable of being produced.

Moreover, in order to detect the light from the central portion, the light leading hoods are so composed as to shield the regularly reflected light rays, and it is a matter of course that the intensive reflected light rays in the regular reflecting direction as shown in FIG. 2 are thereby removed.

I claim:

1. In a photographic camera of the type including an objective lens and a light sensitive member, light shielding means movably disposed in front of and adjacent said light sensitive member, said light shielding means including a front shutter curtain movable from a cocked position to a rest position thereof to initiate exposure of said light sensitive member, and further including a rear shutter curtain movable from a cocked position to a rest position thereof to terminate the exposure, an electric circuit means for timing the actuation of said rear curtain, the improvement comprising:

said front shutter curtain including a surface facing said objective lens and having a light scattering layer thereon with substantially the same reflecting power and scattering property as that of said light sensitive member;

photoelectric means connected in said circuit means and mounted within said camera for receiving light passing through said objective lens and reflected from said light scattering layer when said front shutter curtain is in front of light sensitive member, from said light scattering layer and said light sensitive surface when said light sensitive member is being uncovered, and from said light sensitive member when said light sensitive member is uncovered.

2. The camera according to claim 1 wherein said surface of said front shutter curtain facing said objective lens has a film of thin transparent material coated thereon, said material having dispersed therein particles having a refractive index different from that of said material, thereby imparting to said front shutter curtain the scattering property which is substantially the same as that of said light sensitive member.

3. The camera according to claim 1 wherein said surface of said front shutter curtain facing said objective lens has a thin layer of a high polymer of epoxy resin coated thereon, said resin having dispersed therein zinc sulfide particles.

4. The camera according to claim 1 wherein said surface of said front shutter curtain facing said objective lens has a thin layer of epoxy resin coated thereon, said resin having dispersed therein titanium white ($TiO_2$) particles.

5. The camera according to claim 1 wherein said surface of said front shutter facing said objective lens has a thin layer of epoxy resin coated thereon, said resin having dispersed therein chrome yellow ($PbCrO_4$) particles.

6. The camera according to claim 1 wherein said surface of said front shutter facing said objective lens has a thin layer of epoxy resin coated thereon, said resin having dispersed therein graphite particles.

7. The camera according to claim 1 wherein said surface of said front shutter facing said objective lens has a thin layer of epoxy resin coated thereon, said resin having dispersed therein carbon particles.

* * * * *